United States Patent
Mase et al.

(10) Patent No.: US 9,409,127 B2
(45) Date of Patent: Aug. 9, 2016

(54) HONEYCOMB STRUCTURE AND METHOD FOR MANUFACTURING THE SAME

(71) Applicant: NGK Insulators, Ltd., Nagoya (JP)

(72) Inventors: Kazumi Mase, Nagoya (JP); Yoshimasa Omiya, Nagoya (JP); Atsushi Kaneda, Nagoya (JP); Takashi Noro, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 11 days.

(21) Appl. No.: 14/224,610

(22) Filed: Mar. 25, 2014

(65) Prior Publication Data

US 2014/0294689 A1 Oct. 2, 2014

(30) Foreign Application Priority Data

Mar. 29, 2013 (JP) ................. 2013-074929

(51) Int. Cl.

| | |
|---|---|
| *B01D 50/00* | (2006.01) |
| *B01D 53/94* | (2006.01) |
| *B01D 46/24* | (2006.01) |
| *C04B 35/565* | (2006.01) |
| *C04B 35/573* | (2006.01) |
| *C04B 37/00* | (2006.01) |
| *C04B 38/00* | (2006.01) |
| *F01N 3/20* | (2006.01) |
| *F01N 3/28* | (2006.01) |
| *C04B 35/64* | (2006.01) |
| *C04B 111/94* | (2006.01) |

(52) U.S. Cl.
CPC ............ *B01D 53/94* (2013.01); *B01D 46/2418* (2013.01); *B01D 46/2425* (2013.01); *C04B 35/565* (2013.01); *C04B 35/573* (2013.01); *C04B 35/64* (2013.01); *C04B 37/005* (2013.01); *C04B 38/0006* (2013.01); *C04B 38/0019* (2013.01); *F01N 3/2026* (2013.01); *F01N 3/2828* (2013.01); *B01D 2255/915* (2013.01); *C04B 2111/94* (2013.01); *C04B 2235/3826* (2013.01); *C04B 2235/428* (2013.01); *C04B 2235/6021* (2013.01); *F01N 2330/06* (2013.01); *F01N 2340/00* (2013.01); *F01N 2510/0682* (2013.01); *Y02T 10/26* (2013.01)

(58) Field of Classification Search
CPC .... F01N 3/0222; F01N 3/027; B01D 46/0063
See application file for complete search history.

(56) References Cited

U.S. PATENT DOCUMENTS

| | | | |
|---|---|---|---|
| 5,063,029 A | 11/1991 | Mizuno et al. | |
| 5,277,937 A * | 1/1994 | Bagley | ...................... F01N 3/02 427/126.3 |

(Continued)

FOREIGN PATENT DOCUMENTS

| | | |
|---|---|---|
| JP | 2931362 B2 | 8/1999 |
| JP | 4136319 B2 | 8/2008 |
| WO | 2011/125815 A1 | 10/2011 |

Primary Examiner — Amber R Orlando
(74) Attorney, Agent, or Firm — Burr & Brown, PLLC (57) ABSTRACT

A honeycomb structure includes a tubular honeycomb structure body including porous partition walls defining a plurality of cells, and an outer peripheral wall and a pair of electrode parts disposed on a side face of the honeycomb structure body, wherein the honeycomb structure body has electric resistivity of 1 to 200 Ωcm, each electrode part has a belt-like shape extending in an extending direction of the cells, each electrode part is placed on an opposite side each other across a center of the honeycomb structure body, the honeycomb structure body includes an inflow-side area that is an area on the inflow-side and covering the inflow end face, and an outflow-side area that is an area other than the inflow-side area, and the inflow-side area is made of a material having electric resistivity lower than electric resistivity of a material of the outflow-side area.

9 Claims, 4 Drawing Sheets

(56) References Cited

U.S. PATENT DOCUMENTS

| | | |
|---|---|---|
| 5,288,975 A | 2/1994 | Kondo |
| RE35,134 E | 12/1995 | Mizuno et al. |
| 2003/0134084 A1 | 7/2003 | Ichikawa et al. |
| 2011/0250096 A1 | 10/2011 | Ido et al. |
| 2012/0076698 A1* | 3/2012 | Ishihara ................. B01D 53/00 422/174 |
| 2013/0043236 A1 | 2/2013 | Sakashita et al. |
| 2013/0045137 A1 | 2/2013 | Sakashita et al. |

* cited by examiner

HONEYCOMB STRUCTURE AND METHOD FOR MANUFACTURING THE SAME

The present application is an application based on JP-2013-074929 filed on Mar. 29, 2013 with the Japanese Patent Office, the entire contents of which are incorporated herein by reference.

BACKGROUND OF THE INVENTION

1. Field of the Invention

The present invention relates to a honeycomb structure and a method for manufacturing the same. The present invention more particularly relates to a honeycomb structure functioning as not only a catalyst carrier but also a heater when voltage is applied, thereby it can save energy to be applied thereto at the time of purifying exhaust gas. In the other words, the present invention is directed to an energy-saving honeycomb structure equipped with heater function therein. The present invention further relates to a method for manufacturing such a honeycomb structure with great easiness.

2. Description of Related Art

Conventionally, a cordierite honeycomb structure having a catalyst loaded thereon has been used for treating hazardous substances in exhaust gas emitted from an automobile engine. It is also known that a honeycomb structure formed of a silicon carbide based fired body is used for purifying exhaust gas (see, e.g., Patent Document 1).

In the case of treating exhaust gas with a catalyst loaded on a honeycomb structure, it is necessary to raise temperature of the catalyst to predetermined temperature. However, there is a problem that exhaust gas is not sufficiently purified due to low temperature of the catalyst at the time of engine start.

Therefore, a study was made on a method for heating exhaust gas by providing a metal heater on the upstream side of a honeycomb structure having a catalyst loaded thereon (see, e.g., Patent Document 2).

There is also proposed to use a ceramic honeycomb structure as a "heatable catalyst carrier" (see, e.g., Patent Document 3).

[Patent Document 1] JP 4136319
[Patent Document 2] JP 2931362
[Patent Document 3] WO 2011/125815

SUMMARY OF THE INVENTION

In the case of installing a heater as stated above in an automobile for operation, a power source used for an electrical system of the automobile is shared, and a power source at a high voltage of, for example, 200 V is used as the power source. However, there is a problem that the power-source circuit is damaged due to excessive flow of current when a power source having such high voltage is applied since a metal heater has low electric resistance.

When the heater is made of metal, it is difficult to unify the heater with a catalyst because such a heater has difficulty in loading catalyst thereon even when the heater is processed to have a honeycomb structure.

Furthermore, since the honeycomb structure described in Patent Document 3 is made of ceramic having predetermined electric resistivity, it can generate heat uniformly without causing fluctuations in temperature distribution and giving any damage to its electric circuit when power is applied. The honeycomb structure described in Patent Document 3 is an excellent catalyst carrier of heat generating type. The honeycomb structure, however, has room for improvement in energy saving when it is used to purify exhaust gas by applying voltage thereto, because it is configured to let current uniformly flow through the entire honeycomb structure.

In view of these problems, it is an object of the present invention to provide a honeycomb structure that functions as a catalyst carrier and as a heater simultaneously when voltage is applied thereto, thereby it can save energy when voltage is applied thereto at the time of purifying exhaust gas. It is another object of the present invention to provide a method for manufacturing such a honeycomb structure with great easiness.

In order to fulfill these objects, the present invention provides a honeycomb structure and method for manufacturing a honeycomb structure as mentioned below.

According to a first as sect of the present invention, a honeycomb structure includes: a tubular honeycomb structure body including porous partition walls separating and defining a plurality of cells extending from an inflow-end face as an end face on an inflow-side of fluid to an outflow-end face as an end face on an outflow-side of the fluid and serving as channels for fluid, and an outer peripheral wall located at an outermost periphery is provided; and a pair of electrode parts disposed each on a side face of the honeycomb structure body: said honeycomb structure body having electric resistivity of 1 to 200 Ωcm, and said each electrode part out of the pair of the electrode parts has a belt-like shape extending in an extending direction of the cells of the honeycomb structure body, in a cross section orthogonal to the extending direction of the cells being placed each other on the opposite side across a center of the honeycomb structure body, wherein the honeycomb structure body includes an inflow-side area that is an area at the inflow-side of fluid with covering the inflow-end face, and an outflow-side area that is an area other than the inflow-side area, and wherein the inflow-side area is made of a material having electric resistivity lower than electric resistivity of a material of the outflow-side area.

According to a second aspect of the present invention, in the honeycomb structure according to the first aspect is provided, the honeycomb structure body and the electrode parts are made of a material including silicon carbide.

According to a third aspect of the present invention, in the honeycomb structure according to the first or second aspects is provided, the honeycomb structure body has an end face having a diameter that is three times or less a length of the honeycomb structure body in the cell extending direction.

According to a fourth aspect of the present invention, in the honeycomb structure according to any one of the first or third aspects is provided, the inflow-side area ends at a boundary area forming a boundary zone with the outflow-side area, and the boundary area is an area where electric resistivity thereof gradually changes so that the electric resistivity increases with going closer to the outflow-side area.

According to a fifth aspect of the present invention, a method for manufacturing a honeycomb structure, includes: the step of extruding a forming raw material containing a ceramic raw material to prepare a formed honeycomb body having partition walls that separate and define a plurality of cells extending from one end face to the other end face and serving as channels of fluid, and an outer peripheral wall located at an outermost periphery is provided; the step of drying the formed honeycomb body to prepare a dried honeycomb body; the step of firing the dried honeycomb body to prepare a fired honeycomb body; the step of applying an electrode-part forming raw material containing a ceramic raw material to a side face of the fired honeycomb body, followed by drying, to form a pre-fired electrode, thus preparing a pre-fired electrode attached fired honeycomb body; and the step of firing the pre-fired electrode attached fired honeycomb body to prepare a honeycomb structure. At the fired honeycomb body preparation step, the dried honeycomb body is fired in a state where a plurality of particles including silicon as a main component is brought into contact with an end face on one side of the dried honeycomb body, which becomes an inflow-side face when finished.

Since a honeycomb structure of the present invention is configured so that the inflow-side area is made of a material having electric resistivity lower than electric resistivity of a material of the outflow-side area, current flows more in the inflow-side area when voltage is applied to the honeycomb structure. Meanwhile, materials to be treated that are contained in exhaust gas flowing into the honeycomb structure from the inflow-end face has the highest concentration immediately after the exhaust gas flows into the honeycomb structure, and the concentration decreases with the movement through the honeycomb structure toward the outflow-end face. This is because as the substance to be treated moves through the honeycomb structure toward the outflow-end face, the substance is treated by a catalyst and so the concentration decreases. In this way, the honeycomb structure of the present invention is configured so that current flows more at the inflow-side area "having high concentration of materials to be treated", and current flows less at the outflow-side area "having low concentration of the substance to be treated". Thereby, the honeycomb structure of the present invention allows current flowing therethrough by application of voltage to be used effectively to treat materials to be treated in exhaust gas. This can suppress the flowing of unnecessary current at an area with less substance to be treated.

According to a method for manufacturing a honeycomb structure of the present invention, at the firing step, a pre-fired electrode attached dried honeycomb body is fired in a state where a plurality of particles including silicon as a main component is brought into contact with an end face on one side of the pre-fired electrode attached dried honeycomb body. Therefore when the pre-fired electrode attached dried honeycomb body is fired, silicon contained in the "plurality of particles including silicon as a main component" enters the honeycomb structure from the end face on one side of the honeycomb structure. Thereby "an inflow-side area that is an area made of a material having electric resistivity lower than electric resistivity of a material of an outflow-side area" can be easily formed.

DESCRIPTION OF THE PREFERRED EMBODIMENTS

The following describes embodiments of the present invention, with reference to the drawings. The present invention is not limited to the following embodiments, and it should be understood that modifications, improvements, and the like of the design can suitably be made on the basis of ordinary knowledge of a person skilled in the art within the range of not deviating from the scope of the present invention.

Figure 1:
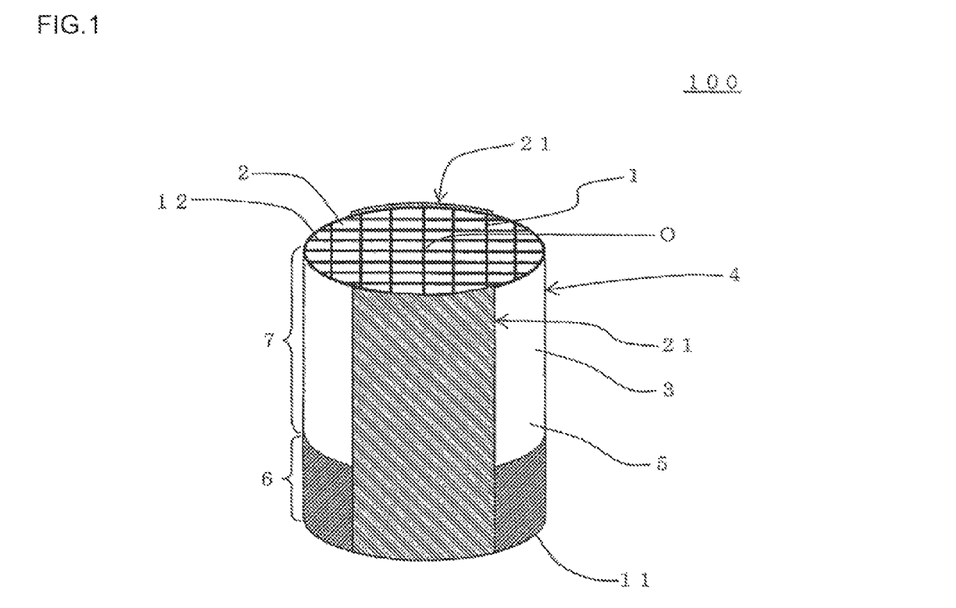
FIG. 1 is a perspective view schematically showing a honeycomb structure that is one embodiment of the present invention.
Figure 2:
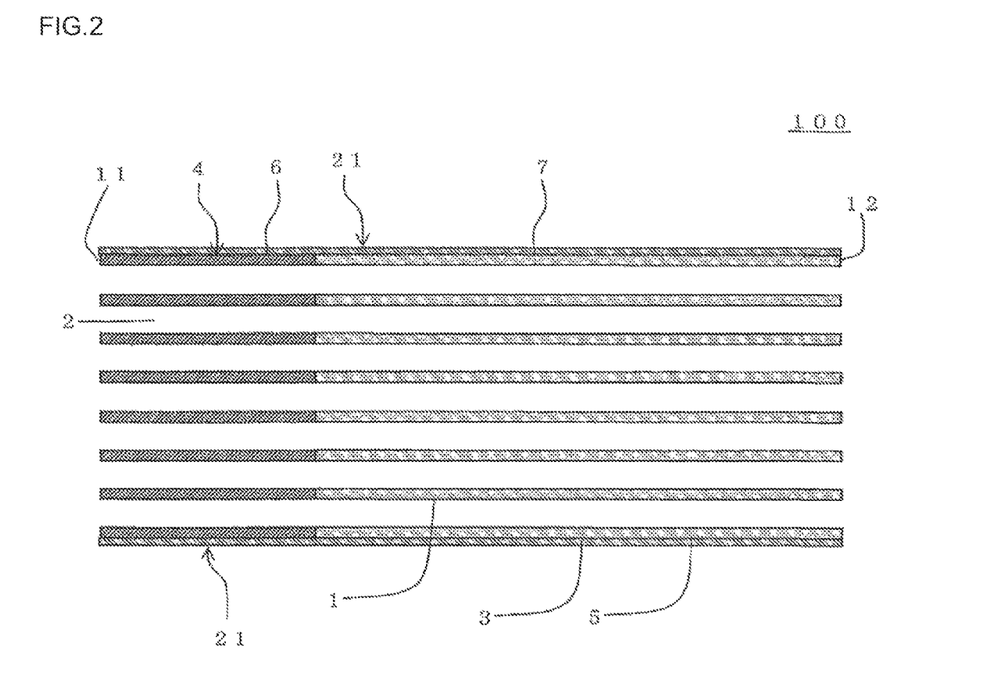
FIG. 2 schematically shows a cross section parallel to the cell extending direction of a honeycomb structure that is one embodiment of the present invention.
Figure 3:
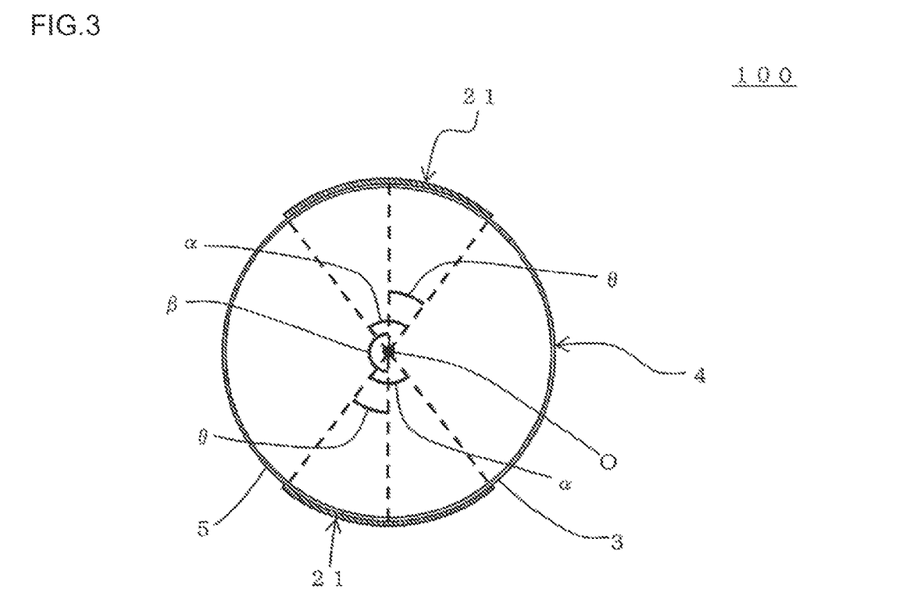
FIG. 3 schematically shows a cross section orthogonal to the cell extending direction of a honeycomb structure that is one embodiment of the present invention.

(1) Honeycomb Structure:

As shown in FIGS. 1 to 3, a honeycomb structure that is one embodiment of the present invention includes a tubular honeycomb structure body 4 and a pair of electrode parts 21, 21 that is placed on a side face 5 of the honeycomb structure body 4. The honeycomb structure body 4 includes: a porous partition wall 1 that separates and defines a plurality of cells 2 extending from an inflow end face 11 as an end face on the inflow-side of fluid to an outflow end face 12 as an end face on the outflow-wide of the fluid and serving as a through channel of the fluid; and an outer peripheral wall 3 located at the outermost periphery. Then the honeycomb structure body 4 has electric resistivity of 1 to 200 Ωcm. Each electrode part out of the pair of the electrode parts 21, 21 has a belt-like shape extending in an extending direction of the cells 2 of the honeycomb structure body 4. In a cross section orthogonal to the extending direction of the cells 2, each electrode part 21 of the pair of electrode parts 21, 21 is placed on the opposite side each other across the center O of the honeycomb structure body 4. The honeycomb structure body 4 is made up of an inflow-side area 6 "that is an area on the fluid inflow-side covering the inflow end face 11" and an outflow-side area 7 (covering the outflow end face 12) "that is an area other than the inflow-side area 6". The inflow-side area 6 is made of a material having electric resistivity lower than electric resistivity of a material of the outflow-side area 7. FIG. 1 is a perspective view schematically showing a honeycomb structure (honeycomb structure 100) that is one embodiment of the present invention. FIG. 2 schematically shows a cross section parallel to the cell extending direction of a honeycomb structure that is one embodiment of the present invention. FIG. 3 schematically shows a cross section orthogonal to the cell extending direction of a honeycomb structure that is one embodiment of the present invention. FIG. 3 omits the partition wall.

In this way, the honeycomb structure 100 of the present embodiment includes the honeycomb structure body 4 having electric resistivity of 1 to 200 Ωcm, and so even if current is applied from a high voltage power source, current does not flow excessively, and it can be suitably used as a heater. Each electrode part out of the pair of the electrode parts 21, 21 of the honeycomb structure 100 of the present embodiment has a belt-like shape extending in the extending direction of the cells 2 of the honeycomb structure body 4. Then in a cross section orthogonal to the extending direction of the cells 2, each electrode part 21 of the pair of electrode parts 21, 21 is placed on the opposite side each other across the center of the honeycomb structure body 4. This configuration can suppress fluctuations in temperature distribution of the honeycomb structure body 4 when voltage is applied between the pair of electrode parts 21, 21. The temperature of the inflow-side area 6 may be different from the temperature of the outflow-side area 7. Fluctuations in temperature distribution of the honeycomb structure body 4 means a state where the temperature rises locally or where the temperature drops locally.

Since the inflow-side area of the honeycomb structure 100 of the present embodiment is made of a material having electric resistivity lower than electric resistivity of a material of the outflow-side area, current flows more in the inflow-side area when voltage is applied to the honeycomb structure. This means that current flows more at the inflow-side area "having high concentration of materials to be treated in exhaust gas" in the honeycomb structure of the present invention, and current flows less at the outflow-side area "having low concentration of the substance to be treated". Thereby, the honeycomb structure of the present invention allows current flowing therethrough by application of voltage to be used effectively to treat materials to be treated in exhaust gas. This can suppress the flowing of unnecessary current at an area with less materials to be treated. As a result, energy required to purify exhaust gas can be saved.

When the honeycomb structure body is divided into an outer peripheral area including the side face and a central area other than the outer peripheral area, the central area preferably has electric resistivity lower than electric resistivity of the outer peripheral area.

"In a cross section orthogonal to the extending direction of the cells 2, each electrode part 21 of the pair of electrode parts 21, 21 is placed on the opposite side each other across the center O of the honeycomb structure body 4" has the following meanings. Let that, in a cross section orthogonal to the extending direction of the cells 2, the "line segment connecting the central point of one electrode part 21 (central point in the "circumferential direction of the honeycomb structure body 4") and the center O of the honeycomb structure body 4" is a first line segment. In the cross section orthogonal to the extending direction of the cells 2, the "line segment connecting the central point of the other electrode part 21 (central point in the "circumferential direction of the honeycomb structure body 4") and the center O of the honeycomb structure body 4" is a second line segment. Then, it is meant that the pair of electrode parts 21, 21 is placed at the honeycomb structure body 4 in such a manner that angle β (the angle around the "center O" (see FIG. 3)) formed between the first line segment and the second line segment is in the range of 170° to 190°. "Central angle α of an electrode part 21" is the angle defined by two line segments connecting both ends of the electrode part 21 and the center O of the honeycomb structure body 4 in the cross section orthogonal to the cell extending direction as shown in FIG. 3. The "central angle α of an electrode part 21" can be said as follows as well. Let that, in the cross section orthogonal to the extending direction of the cells, the "line segment connecting one end part of the electrode part 21 and the center O" is a third line segment. In the cross section orthogonal to the extending direction of the cells, the "line segment connecting the other end part of the electrode part 21 and the center O" is a fourth line segment. Then, the "central angle α of the electrode part 21" is the interior angle at the part of the center O in a shape (e.g., a sector shape) defined by the "electrode part 21", the third line segment and the fourth line segment in a cross section orthogonal to the cell-extending direction.

The value of a ratio of the electric resistivity of the inflow-side area 6 to the electric resistivity of the outflow-side area 7 (resistivity ratio of inflow-side area/outflow-side area) is preferably 0.35 to 0.95, and more preferably 0.4 to 0.9. If the "ratio of inflow-side area/outflow-side area" is lower than 0.35, current may flow too much. If the "ratio of inflow-side area/outflow-side area" is higher than 0.95, it becomes hard to let current flow more at the inflow area, so that the advantageous effect of the present invention may not be obtained. The electric resistivity is a value measured by a four-terminal method.

The honeycomb structure 100 of the present embodiment preferably has "a length of the inflow-side area 6 in the cell extending direction" that is 1 to 50% of "a length of the honeycomb structure body 100 in the cell extending direction". It is more preferable to have a length that is 10 to 30%. If the length is shorter than 1%, the effect of "effectively using current flowing by application of voltage to treat materials to be treated in exhaust gas" may be lowered. If the length is longer than 50%, unnecessary current may flow as a whole when voltage is applied thereto.

The honeycomb structure 100 of the present embodiment preferably includes the honeycomb structure body 4 and the electrode parts 21 that are made of a material containing silicon carbide. Exemplary materials containing silicon carbide include a material containing a silicon-silicon carbide composite material, silicon carbide or the like as a main component. Among them, a material containing a silicon-silicon carbide composite material as a main component is more preferable. A material of the honeycomb structure body 4 and the electrode parts 21 is especially preferably a material containing 10 mass % or more of a silicon-silicon carbide composite material. "The material is a silicon-silicon carbide composite material" in the present specification means that it contains 10 mass % or more of "a silicon-silicon carbide composite material". Herein, the "main component" means that the material contains 90 mass % or more of the component in the material as a whole. A silicon-silicon carbide composite material is a material where a plurality of silicon carbide particles bonds with metal silicon. Such a silicon-silicon carbide composite material is preferably porous because "a plurality of silicon carbide particles bonds with metal silicon so as to form pores between the silicon carbide particles". The use of such a material allows the honeycomb structure body to have electric resistivity of 1 to 200 Ωcm. The electric resistivity of the honeycomb structure body is a value at 400° C. Since the honeycomb structure body 4 and the electrode parts 21 include silicon carbide particles and silicon as main components, the electrode parts 21 and the honeycomb structure body 4 can have the same component or a similar component, and so the electrode parts 21 and the honeycomb structure body 4 have the same or similar coefficient of thermal expansion. Since they are made of the same or similar materials, the bonding strength between the electrode parts 21 and the honeycomb structure body 4 also can be high. Then even if thermal stress is applied to the honeycomb structure, the electrode parts 21 will not peel off from the honeycomb structure body 4 or the bonding part between the electrode parts 21 and the honeycomb structure body 4 will not break.

When the inflow-side area 6 and the outflow-side area 7 are made of a silicon-silicon carbide composite material, the inflow-side area 6 preferably has low electric resistivity because "the content of metal silicon in the silicon-silicon carbide composite material is higher than that at the outflow-side area 7".

When the inflow-side area 6 is made of a silicon-silicon carbide composite material, the content of metal silicon in the silicon-silicon carbide composite material is preferably 10 to 50 mass %, and more preferably 20 to 40 mass %. If the content is less than 10 mass %, the inflow-side area 6 may have too high electric resistivity. If the content is more than 50 mass %, the inflow-side area 6 may have too low electric resistivity.

When the outflow-side area 7 is made of a silicon-silicon carbide composite material, the content of metal silicon in the silicon-silicon carbide composite material is preferably 10 to 50 mass %, and more preferably 10 to 30 mass %. If the content is less than 10 mass %, the outflow-side area 7 may have too high electric resistivity. If the content is more than 50 mass %, the outflow-side area 7 may have too low electric resistivity.

Figure 4:
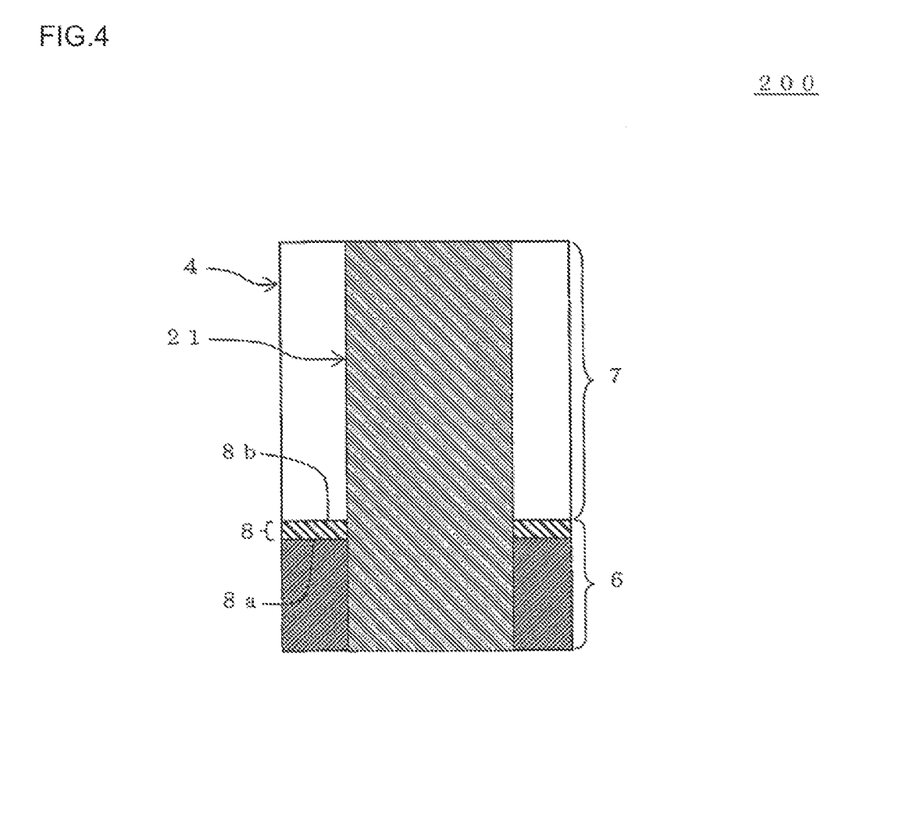
FIG. 4 is a front view schematically showing a honeycomb structure that is another embodiment of the present invention.

The honeycomb structure of the present invention preferably has a boundary area 8 at a boundary zone between the inflow-side area 6 and the outflow-side area 7 (see FIG. 4). Then, the boundary area 8 preferably is an area where its electric resistivity gradually changes so that the electric resistivity increases with going closer to the outflow-side area 7. The boundary area 8 is an area where its electric resistivity changes at the ratio of 0.1 Ωcm/cm or more from an "end 8a on the side of the inflow-side area 6" to "the boundary zone 8b with the outflow-side area 7". That is, the boundary area 8 has a rate of change in electric resistivity "from the end on the side of the inflow-side area 6 to the start of the outflow-side area 7" in the cell extending direction that is 0.1 Ωcm/cm or more. The boundary area 8 preferably has a rate of change in electric resistivity "from the end on the side of the inflow-side area 6 to the start of the outflow-side area 7" in the cell extending direction that is 0.1 to 10 Ωcm/cm. It is more preferable that the rate of change is 0.5 to 10 Ωcm/cm. If it is larger than 10 Ωcm/cm, current concentrates on at the boundary part, which may cause cracks or a short circuit. The boundary area 8 preferably has a length in the cell extending direction that is 3 to 30% of the length of the honeycomb structure body in the cell extending direction, and more preferably 3 to 20%. If the length is shorter than 3%, current concentrates on at the boundary part, which may cause cracks or a short circuit. When the inflow-side area 6 is made of "a silicon-silicon carbide composite material", the boundary area 8 preferably is configured as follows. That is, the boundary area 8 is preferably formed so that its electric resistivity changes because "the content of metal silicon gradually changes from "the end 8a on the side of the inflow-side area 6 to the boundary 8b with the outflow-side area 7". Herein, the electric resistivity of the inflow-side area 6 means electric resistivity of the inflow-side area 6 and the boundary area 8 in the present specification. FIG. 4 is a front view schematically showing a honeycomb structure (honeycomb structure 200) that is another embodiment of the present invention. Preferably the honeycomb structure 200 of the present embodiment is the same as the honeycomb structure that is one embodiment of the present invention (honeycomb structure 100 (see FIG. 1)) except that it has the boundary area 8.

As shown in FIGS. 1 to 3, the honeycomb structure 100 of the present embodiment includes a pair of electrode parts 21, 21 that are placed on the side face 5 of the honeycomb structure body 4. The honeycomb structure 100 of the present embodiment generates heat by applying voltage between the pair of electrode parts 21, 21. The voltage to be applied is preferably 12 to 900 V, more preferably 64 to 600 V.

When the honeycomb structure 100 of the present embodiment includes the honeycomb structure body 4 made of "a silicon-silicon carbide composite material", silicon carbide particles (aggregate) making up the honeycomb structure body 4 preferably have an average particle size of 3 to 50 μm. Silicon carbide particles (aggregate) making up the honeycomb structure body 4 more preferably have an average particle size of 3 to 40 μm. Such a range of the average particle size of silicon carbide particles making up the honeycomb structure body 4 allows the electric resistivity of the honeycomb structure body 4 to be 1 to 200 Ωcm at 400° C. If the average particle size of silicon carbide particles is less than 3 μm, the honeycomb structure body 4 may have large electric resistivity. If the average particle size of silicon carbide particles is larger than 50 μm, the honeycomb structure body 4 may have small electric resistivity. If the average particle size of silicon carbide particles is larger than 50 μm, the die for extrusion may be clogged with the forming raw material during forming of a formed honeycomb body by extrusion. The average particle size of the silicon carbide particles is a value measured by a laser diffraction method.

The partition wall 1 of the honeycomb structure body 4 preferably has porosity of 35 to 60%, more preferably 35 to 45%. If the porosity is less than 35%, deformation during firing may be large. If the porosity exceeds 60%, strength of the honeycomb structure may be lowered. The porosity is a value measured by a mercury porosimeter.

The partition wall 1 of the honeycomb structure body 4 preferably has an average pore size of 2 to 15 μm, more preferably 4 to 8 μm. If the average pore size is smaller than 2 μm, the electric resistivity may become too large. If the average pore size is larger than 15 μm, the electric resistivity may become too small. The average pore size is a value measured by a mercury porosimeter.

The honeycomb structure 100 of the present embodiment preferably includes the partition wall 1 of the honeycomb structure body 4 of 50 to 200 μm in thickness, more preferably 70 to 180 μm. Such a range of the thickness of the partition wall can control pressure loss so as not to be too large when exhaust gas flows therethrough, even when the honeycomb structure 100 is used as a catalyst carrier having a catalyst loaded thereon. If the thickness of the partition wall is thinner than 50 μm, the strength of the honeycomb structure may be lowered. If the thickness of the partition wall is thicker than 200 μm, pressure loss may be large when exhaust gas flows therethrough, when the honeycomb structure 100 is used as a catalyst carrier having a catalyst loaded thereon.

The honeycomb structure 100 of the present embodiment preferably includes the honeycomb structure body 4 with cell density of 40 to 150 cells/cm$^2$, more preferably 70 to 100 cells/cm$^2$. Such a range of the cell density can increase purification performance of the catalyst in a state of low pressure loss when exhaust gas flows therethrough. If the cell density is lower than 40 cells/cm$^2$, the catalyst-loading area may be reduced. If the cell density is higher than 150 cells/cm$^2$, pressure loss may become large when exhaust gas flows therethrough, when the honeycomb structure 100 is used as a catalyst carrier having a catalyst loaded thereon.

The shape of the honeycomb structure 100 of the present embodiment (the shape of the honeycomb structure body 4) is not particularly limited and may be, for example, a tubular shape having a circular bottom face (cylindrical shape), a tubular shape having an oval bottom face, a tubular shape having a polygonal (quadrangular, pentagonal, hexagonal, heptagonal, octagonal, etc.) bottom face. The honeycomb structure (honeycomb structure body) preferably has the size of 2,000 to 20,000 mm$^2$ in the area of the bottom face, more preferably 4,000 to 10,000 mm$^2$. The honeycomb structure (honeycomb structure body) preferably has a length in the central axial direction of 50 to 200 mm, more preferably 75 to 150 mm. The honeycomb structure body preferably has a diameter of the end face that is three times or less the length in the cell extending direction of the honeycomb structure body, more preferably 0.5 to 2.5 times and particularly preferably 0.8 to 2 times. If the diameter of the end face of the honeycomb structure body exceeds three times the length in the cell extending direction of the honeycomb structure body, the volume of the honeycomb structure becomes small, which may lead to a failure to load a catalyst in the amount capable of exerting sufficient exhaust-gas purification performance.

The honeycomb structure 100 of the present embodiment includes the outer peripheral wall 3 constituting the outermost periphery of the honeycomb structure body 4, the outer peripheral wall 3 preferably having a thickness of 0.1 to 2 mm. If the thickness is thinner than 0.1 mm, the strength of the honeycomb structure 100 may be lowered. If the thickness is thicker than 2 mm, the area of the partition wall to load a catalyst may become small.

The honeycomb structure 100 of the present embodiment preferably has a shape of the cell 2 in a cross section orthogonal to the extending direction of the cells 2 that is a quadrangle, a hexagon, an octagon, or a combination thereof. Such a cell shape can reduce pressure loss when exhaust gas flows through the honeycomb structure 100, and purification performance of the catalyst becomes excellent.

As shown in FIGS. 1 to 3, the honeycomb structure 100 of the present embodiment includes a pair of electrode parts 21, 21 that are each formed as a "belt-like shape" extending in the extending direction of the cells 2 of the honeycomb structure body 4. Then in a cross section orthogonal to the extending direction of the cells 2, each electrode part out of the pair of the electrode parts 21, 21 is placed on the opposite side each other across the center part O of the honeycomb structure body 4. In this way, the honeycomb structure 100 of the present embodiment includes the electrode parts 21 formed as a "belt-like shape", the electrode parts 21, 21 having a longitudinal direction in the extending direction of the cells 2 of the honeycomb structure body 4, and the pair of electrode parts 21, 21 is placed on the opposite side each other across the center part O of the honeycomb structure body 4. This configuration can suppress fluctuations of current flowing therethrough at each of the inflow-side area 6 and the outflow-side area 7 when voltage is applied between the pair of electrode parts 21, 21, and accordingly fluctuations of heat generation at each of the inflow-side area 6 and the outflow-side area 7 can be suppressed.

In a cross section orthogonal to the extending direction of the cells 2, 0.5 time the central angle $\alpha$ of each electrode part 21, 21 (angle $\theta$ that is 0.5 time the central angle $\alpha$) is preferably 15° to 65°. In a cross section orthogonal to the extending direction of the cells 2, the upper limit of the "angle $\theta$ of 0.5 time the central angle $\alpha$" of the electrode parts 21, 21 is preferably 60°, more preferably 55°. In a cross section orthogonal to the extending direction of the cells 2, the lower limit of the "angle $\theta$ of 0.5 time the central angle $\alpha$" of the electrode parts 21, 21 is preferably 20°, more preferably 30°. The "angle $\theta$ of 0.5 time the central angle $\alpha$" of one electrode part 21 is preferably 0.8 to 1.2 times, more preferably 1.0 time (the same size as) the "angle $\theta$ of 0.5 time the central angle $\alpha$" of the other electrode part 21. This can suppress fluctuations of the current flowing therethrough at each of the inflow-side area 6 and the outflow-side area 7 when voltage is applied between the pair of electrode parts 21, 21, and accordingly can suppress fluctuations of heat generation at each of the inflow-side area 6 and the outflow-side area 7.

The honeycomb structure 100 of the present embodiment preferably includes the electrode parts 21 having electric resistivity lower than electric resistivity of the inflow-side area 6 of the honeycomb structure body 4. The electric resistivity of the electrode parts 21 preferably is 20% or less of the electric resistivity of the inflow-side area 6 of the honeycomb structure body 4, more preferably 1 to 10%. The electric resistivity of the electrode parts 21 that is 20% or less of the electric resistivity of the inflow-side area 6 of the honeycomb structure body 4 allows the electrode parts 21 to function as electrodes more effectively.

The electrode parts 21 preferably have a thickness of 0.01 to 5 mm, more preferably 0.01 to 3 mm. Such a range enables to generate heat at the inflow-side area 6 and the outflow-side area 7 uniformly. If the thickness of the electrode parts 21 is thinner than 0.01 mm, electrical resistance may be too high to generate heat uniformly. When it is thicker than 5 mm, breakage may occur during canning.

As shown in FIGS. 1 and 2, in the honeycomb structure 100 of the present embodiment, each electrode part out of the pair of the electrode parts 21, 21 extends in the extending direction of the cells 2 of the honeycomb structure body 4 and is formed as a belt-like shape extending "over between both of the end parts (between both of the end faces 11 and 12)". In this way, since the pair of electrode parts 21, 21 is disposed so as to extend over between both of the end parts of the honeycomb structure body 4, fluctuation of current flowing through at each of the inflow-side area 6 and the outflow-side area 7 can be suppressed more effectively when voltage is applied between the pair of electrode parts 21, 21. Herein, "the electrode parts 21 are formed (placed) so as to extend over between both of the end parts of the honeycomb structure body 4" means that one end part of the electrode part 21 comes into contact with one end part (one end face) of the honeycomb structure body 4 and the other end part of the electrode part 21 comes into contact with the other end part (the other end face) of the honeycomb structure body 4.

In another preferable embodiment, at least one end part of the electrode part 21 "in the extending direction of the cells 2 of the honeycomb structure body 4" does not come into contact with (does not reach) an end part (end face) of the honeycomb structure body 4. This can improve thermal shock resistance of the honeycomb structure. In this case, however, it is preferable that one end part of the electrode part 21 is disposed on the side face at the inflow-side area and the other end part of the electrode part is disposed on the side face at the outflow-side area.

As shown in FIGS. 1 to 3, for example, the honeycomb structure of the present embodiment includes the electrode parts 21 having a shape where a planar rectangular member is curved along the outer periphery of the cylindrical shape. Herein, the shape obtained by deforming the curved electrode part 21 to be a shape of a planar member that is not curved is referred to as a "planar shape" of the electrode part 21. The aforementioned "planar shape" of the electrode parts 21 shown in FIGS. 1 to 3 is rectangular. Then the "outer peripheral shape of an electrode part" means the "outer peripheral shape of a planar shape of the electrode part".

The honeycomb structure of the present embodiment may have the outer peripheral shape of the belt-like shaped electrode parts where corners of the rectangle are formed to be a curved shape. Such a shape can improve thermal shock resistance of the honeycomb structure. In another preferable embodiment, the outer peripheral shape of the belt-like shaped electrode parts is such that corners of the rectangle are linearly chamfered. Such a shape can improve thermal shock resistance of the honeycomb structure.

The electrode parts 21 preferably have electric resistivity of 0.1 to 100 $\Omega$cm, more preferably 0.1 to 50 $\Omega$cm. Such a range of the electric resistivity of the electrode parts 21 enables the pair of electrode parts 21, 21 to effectively play a role of electrodes in a conduit where high temperature exhaust gas flows. If the electric resistivity of the electrode parts 21 is smaller than 0.1 $\Omega$cm, temperature of the honeycomb part in the vicinity of both ends of the electrode parts 21 in a cross section orthogonal to the cell extending direction may easily rise. If the electric resistivity of the electrode parts 21 is larger than 100 Ωcm, since current hardly flows, they may have difficulty in playing a role of an electrode. The electric resistivity of the electrode parts is a value at 400° C.

The electrode parts 21 preferably have porosity of 30 to 60%, more preferably 30 to 55%. Such a range of porosity of the electrode parts 21 leads to suitable electric resistivity. If the porosity of the electrode parts 21 is lower than 30%, deformation may occur during manufacturing. If the porosity of the electrode parts 21 is higher than 60%, the electric resistivity may become too high. The porosity is a value measured by a mercury porosimeter.

The electrode parts 21 preferably have an average pore size of 5 to 45 μm, more preferably 7 to 40 μm. Such a range of the average pore size of the electrode parts 21 leads to suitable electric resistivity. If the average pore size of the electrode parts 21 is smaller than 5 μm, the electric resistivity may become too high. If the average pore size of the electrode parts 21 is larger than 45 μm, the strength of the electrode parts 21 may become low, which may easily cause breakage of the electrode parts. The average pore size is a value measured by a mercury porosimeter.

In the case that the main component of the electrode parts 21 is a "silicon-silicon carbide composite material", the average particle size of the silicon carbide particles contained in the electrode parts 21 is preferably 10 to 60 μm, more preferably 20 to 60 μm. Such a range of the average particle size of the silicon carbide particles contained in the electrode parts 21 can control the electric resistivity of the electrode parts 21 to be in the range from 0.1 to 100 Ωcm. If the average particle size of the silicon carbide particles contained in the electrode parts 21 is smaller than 10 μm, the electric resistivity of the electrode parts 21 may become too large. If the average particle size of the silicon carbide particles contained in the electrode parts 21 is larger than 60 μm, the strength of the electrode parts 21 may become low, which may easily cause breakage of the electrode parts. The average particle size of the silicon carbide particles contained in the electrode parts 21 is a value measured by a laser diffraction method.

In the case that the main component of the electrode parts 21 is a "silicon-silicon carbide composite material", the mass ratio of silicon contained in the electrode parts 21 to the "total mass of silicon carbide particles and silicon" contained in the electrode parts 21 is preferably 20 to 40 mass %. The mass ratio of silicon to the "total mass of silicon carbide particles and silicon" contained in the electrode parts 21 is more preferably 25 to 35 mass %. Such a range of the mass ratio of silicon to the "total mass of silicon carbide particles and silicon" contained in the electrode parts 21 can make the electric resistivity of the electrode parts 21 in the range from 0.1 to 100 Ωcm. If the mass ratio of silicon to the "total mass of silicon carbide particles and silicon" contained in the electrode parts 21 is smaller than 20 mass %, the electric resistivity may become too large, and if it is larger than 40 mass %, deformation may easily occur during manufacturing.

The honeycomb structure 100 of the present embodiment preferably has isostatic strength of 1 MPa or more, more preferably 3 MPa or more. Although higher isostatic strength is preferable, the upper limit thereof is about 6 MPa in consideration of the material, structure, and the like of the honeycomb structure 100. If the isostatic strength is less than 1 MPa, breakage may easily occur when the honeycomb structure is used as a catalyst carrier or the like. The isostatic strength is a value measured by applying hydrostatic pressure thereto in water.

(2) Method for Manufacturing a Honeycomb Structure:

The following describes a method for manufacturing a honeycomb structure of the present invention.

A method for manufacturing a honeycomb structure that is one embodiment of the present invention includes: a formed honeycomb body preparation step; a dried honeycomb body preparation step; a fired honeycomb body preparation step; a pre-fired electrode attached fired honeycomb body preparation step; and a honeycomb structure preparation step. According to the method for manufacturing a honeycomb structure of the present embodiment, at the fired honeycomb body preparation step, a dried honeycomb body is fired in a state where a plurality of particles including silicon as a main component is brought into contact with an end face on one side of the dried honeycomb body. At the formed honeycomb body preparation step, a forming raw material containing a ceramic raw material is extruded to prepare a formed honeycomb body having partition walls that separate and define a plurality of cells extending from one end face to the other end face and serving as channels of fluid, and an outer peripheral wall located at the outermost periphery. At the dried honeycomb body preparation step, the formed honeycomb body is dried to prepare a dried honeycomb body. At the fired honeycomb body preparation step, the dried honeycomb body is fired to prepare a fired honeycomb body. At the pre-fired electrode attached fired honeycomb body preparation step, an electrode-part forming raw material containing a ceramic raw material is applied to a side face of the fired honeycomb body, followed by drying, to form a pre-fired electrode, thus preparing a pre-fired electrode attached fired honeycomb body. At the honeycomb structure preparation step, the pre-fired electrode attached fired honeycomb body is fired to prepare a honeycomb structure.

In this way, according to the method for manufacturing a honeycomb structure of the present embodiment, at the firing step, a pre-fired electrode attached dried honeycomb body is fired in a state where "a plurality of particles including silicon as a main component" is brought into contact with an end face on one side of the pre-fired electrode attached dried honeycomb body. Therefore when the pre-fired electrode attached dried honeycomb body is fired, silicon contained in the "plurality of particles including silicon as a main component" penetrates into the honeycomb structure from the end face on one side of the honeycomb structure, whereby "a fired honeycomb body infiltrated with silicon on one end face side" can be obtained. Resultantly, "an inflow-side area that is an area made of a material having electric resistivity lower than electric resistivity of a material of an outflow-side area" can be easily formed.

The following describes a method for manufacturing a honeycomb structure of the present embodiment for each step.

(2-1) Formed Honeycomb Body Preparation Step:

Firstly a forming raw material is preferably prepared by adding metal silicon powders (metal silicon), binder, surfactant, pore former, water and the like to silicon carbide powders (silicon carbide). The mass of metal silicon powders is preferably 10 to 40 mass % with reference to the total of the mass of silicon carbide powders and the mass of metal silicon powders. The average particle size of silicon carbide particles in the silicon carbide powders is preferably 3 to 50 μm, more preferably 3 to 40 μm. The average particle size of the metal silicon powders (metal silicon) is preferably 2 to 35 μm. The average particle size of the silicon carbide particles and metal silicon particles (metal silicon) is a value measured by a laser diffraction method. The silicon carbide particles are fine particles of silicon carbide constituting the silicon carbide powders, and the metal silicon particles are fine particles of metal silicon constituting the metal silicon powders. This is a composition of a forming raw material in the case where the honeycomb structure body is made of a silicon-silicon carbide composite material, and metal silicon is not added in the case where the honeycomb structure body is made of silicon carbide.

Exemplary binder includes methyl cellulose, hydroxypropyl methylcellulose, hydroxypropoxyl cellulose, hydroxyethyl cellulose, carboxymethyl cellulose, polyvinyl alcohol or the like. Among them, methyl cellulose and hydroxypropoxyl cellulose are preferably used together. The content of the binder is preferably 2.0 to 10.0 parts by mass with reference to 100 parts by mass of the total mass of the silicon carbide powder and the metal silicon powder.

The content of water is preferably 20 to 60 parts by mass when taking the total mass of the silicon carbide powder and the metal silicon powder as 100 parts by mass.

Exemplary surfactant used includes ethylene glycol, dextrin, fatty acid soap, or polyalcohol. They may be used alone or in combination of two or more types. The content of the surfactant is preferably 0.1 to 2.0 parts by mass when taking the total mass of the silicon carbide powder and the metal silicon powder as 100 parts by mass.

The pore former is not limited especially as long as it forms pores after firing, and exemplary pore former includes graphite, starch, resin balloon, water absorbing resin, and silica gel. The content of the pore former is preferably 0.5 to 10.0 parts by mass when taking the total mass of the silicon carbide powder and the metal silicon powder as 100 parts by mass. The average particle size of the pore former is preferably 10 to 30 µm. If it is smaller than 10 µm, pores may not be formed well. If it is larger than 30 µm, the die may be clogged during forming. The average particle size of the pore former is a value measured by a laser diffraction method.

Next, the forming raw material is preferably kneaded to form a kneaded material. A method for kneading the forming raw material to form a kneaded material is not limited especially, and a kneader or a vacuum pugmill may be used for this purpose, for example.

Next, a formed honeycomb body is formed by extruding the kneaded material (forming raw material). The extrusion is preferably performed using a die having desired overall shape, cell shape, partition wall thickness, cell density, and the like. A preferable material of the die is cemented carbide having wear resistance. The formed honeycomb body has a structure having partition walls that separate and define a plurality of cells extending from one end face and to the other end face and serving as channels of fluid and an outer peripheral wall located at the outermost periphery.

The partition wall thickness, cell density, outer peripheral wall thickness, and the like of the formed honeycomb body can be determined appropriately depending on the structure of a honeycomb structure of the present invention to be manufactured in consideration of contraction during drying and firing.

(2-2) Dried Honeycomb Body Preparation Step:

The thus obtained formed honeycomb body is preferably dried. A method for drying is not limited especially, and exemplary methods include an electromagnetic wave heating method such as microwave heat-drying and high-frequency dielectric heat-drying and an external heating method such as hot air drying and superheated steam drying. Among them, it is preferable that after a certain amount of water is dried by an electromagnetic wave heating method, followed by an external heating method to dry the remaining water, because the entire formed body can be dried quickly and uniformly with no crack generated. As the conditions for drying, it is preferable that, after 30 to 99 mass % of water with reference to the water amount before drying is removed by an electromagnetic heating method, followed by an external heating method to reduce water amount to 3 mass % or less. A preferable electromagnetic wave heating method includes dielectric heat-drying, and a preferable external heating method includes hot air drying. The drying temperature is preferably at 50 to 100° C.

If the length of the formed honeycomb body in the central axial direction is over the predetermined length, it is preferable to cut both of the end faces (end parts) to have a predetermined length. Although a method for cutting is not limited especially, exemplary method includes using a circular saw cutter.

(Fired Honeycomb Body Preparation Step)

Figure 5:
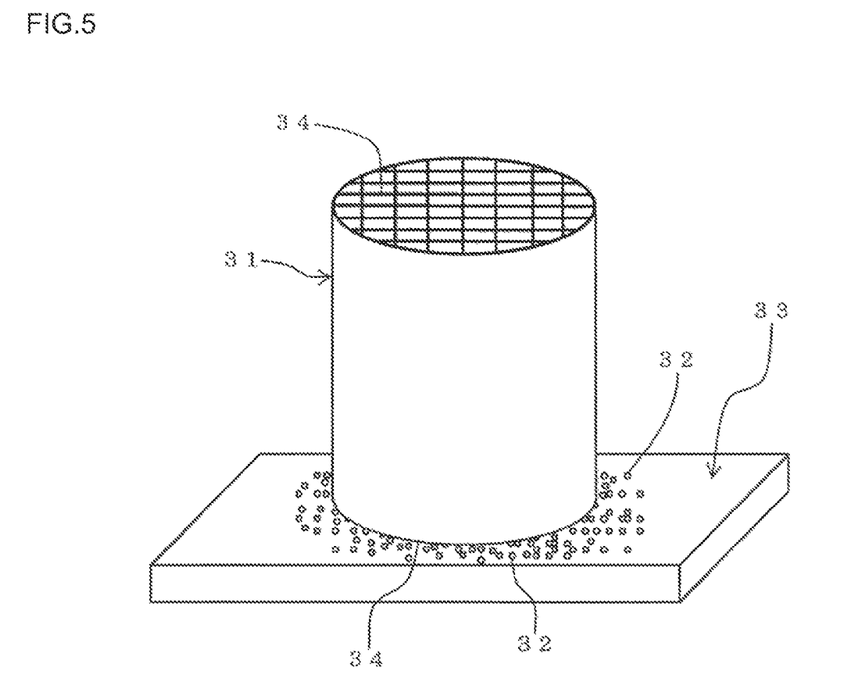
FIG. 5 is a perspective view schematically showing the state of a firing step of a method for manufacturing a honeycomb structure that is one embodiment of the present invention, where a plurality of particles including silicon as a main component is spread on a mounting table, on which a dried honeycomb body is mounted.

Next, the dried honeycomb body is preferably fired to prepare a fired honeycomb body. To fire the dried honeycomb body, firing is to be performed while bringing a plurality of particles including silicon as a main component into contact with an end face on one side of the dried honeycomb body. Specifically as shown in FIG. 5, "particles 32 including silicon as a main component" are spread on a mounting table 33 in such a manner to spread joint sand, on which (on the particles 32 including silicon as a main component) a dried honeycomb body 31 is preferably mounted so as to direct its end face 34 on one side downward. Silicon of the particles 32 including silicon as a main component is preferably metal silicon. Then, the dried honeycomb body 31 is preferably fired in this state. Resultantly, silicon of the "particles 32 including silicon as a main component" is melted during firing, and the melted silicon penetrates into the dried honeycomb body 31 from the end face 34 on one side. Then, the area where silicon enters becomes an inflow-side area in the fired honeycomb body obtained after firing.

A method for "bringing a plurality of particles including silicon as a main component into contact with an end face on one side of the dried honeycomb body" may be the following method. For instance, slurry (or paste) containing metal silicon may be applied as the silicon to the end face 34 on one side of the dried honeycomb body 31.

In the case of dividing the honeycomb structure body into an outer peripheral area and a central area, a method to allow the central area to have electric resistivity lower than electric resistivity of the outer peripheral area may be the following method. The dried honeycomb body is preferably fired in the state where "a plurality of particles including silicon as a main component" is brought into contact with a side face of the dried honeycomb body as well. A method for bringing "the plurality of particles including silicon as a main component" into contact with the side face of the dried honeycomb body as well is preferably a method including dispersing "a plurality of particles including silicon as a main component" in a dispersion medium to prepare a dispersed liquid (slurry or paste), and applying the dispersed liquid to the side face (outer peripheral face) of the dried honeycomb body.

The particles including silicon as a main component preferably have silicon content of 50 mass % or more. The particles including silicon as a main component preferably have an average particle size of 2 to 35 µm. The average particle size is a value measured by a laser diffraction method.

The method for manufacturing a honeycomb structure of the present invention is to adjust electric resistivity at the side face on the inflow side by adjusting the amount of "a plurality of particles including silicon as a main component" that penetrates into from the end face on one side of the dried honeycomb body. Resultantly, electric resistivity at the inflow-side end face can be easily adjusted. When "particles 32 including silicon as a main component" are spread on the mounting table 33 in such a manner to spread joint sand as shown in FIG. 5, the total amount of "the plurality of particles including silicon as a main component" located underneath the end face of the dried honeycomb body is preferably 10 to 200 g. To be "located underneath the end face of the dried honeycomb body" means that, when the dried honeycomb body is placed on the mounting table, they are within the range of the outer periphery of the lower end face of the dried honeycomb body. That is, the total amount of "the plurality of particles including silicon as a main component" located underneath the end face of the dried honeycomb body is the amount penetrating into the inside of the dried honeycomb body during firing. In this case, the lower side (end face) of the dried honeycomb body becomes the inflow-side (end face) finally.

It is preferable to perform calcination before firing to remove the binder and the like. The calcination is preferably performed at 400 to 500° C. for 0.5 to 20 hours in the ambient atmosphere. A method for calcination or firing is not limited especially, and firing may be performed using an electric furnace, a gas furnace, or the like. As the firing conditions, it is preferably heated at 1,400 to 1,500° C. for 1 to 20 hours in an inert atmosphere of nitrogen, argon, or the like. After firing, it is preferable to perform an oxygenation treatment at 1,200 to 1,350° C. for 1 to 10 hours for improved durability.

(Pre-Fired Electrode Attached Fired Honeycomb Body Preparation Step)

Next, an electrode part-forming raw material for forming an electrode part preferably is prepared. In the case that the main component of the electrode part is a "silicon-silicon carbide composite material", the electrode part-forming raw material is preferably formed by adding predetermined additives to silicon carbide powders and silicon powders and kneading them.

Specifically, it is preferable that metal silicon powders (metal silicon), binder, surfactant, pore former, water, and the like are added to silicon carbide powders (silicon carbide), and they are kneaded to prepare an electrode part-forming raw material. It is preferable that the mass of metal silicon is 20 to 40 parts by mass when taking the total mass of the silicon carbide powders and the metal silicon powders as 100 parts by mass. The silicon carbide particles in the silicon carbide powders preferably have an average particle size of 10 to 60 μm. The average particle size of the metal silicon powders (metal silicon) is preferably 2 to 20 μm. If the average particle size of the metal silicon powders (metal silicon) is smaller than 2 μm, the electric resistivity may become too small. If the average particle size of the metal silicon powders (metal silicon) is larger than 20 μm, the electric resistivity may become too large. The average particle size of the silicon carbide particles and metal silicon particles (metal silicon) is a value measured by a laser diffraction method. The silicon carbide particles are fine particles of silicon carbide constituting the silicon carbide powders, and the metal silicon particles are fine particles of metal silicon constituting the metal silicon powders.

Exemplary binder includes methyl cellulose, hydroxypropyl methylcellulose, hydroxypropoxyl cellulose, hydroxyethyl cellulose, carboxymethyl cellulose, polyvinyl alcohol or the like. Among them, methyl cellulose and hydroxypropoxyl cellulose are preferably used together. The content of the binder is preferably 0.1 to 5.0 parts by mass when taking the total mass of the silicon carbide powders and the metal silicon powders as 100 parts by mass.

The content of water is preferably 15 to 60 parts by mass when taking the total mass of the silicon carbide powders and the metal silicon powders as 100 parts by mass.

Exemplary surfactant used includes ethylene glycol, dextrin, fatty acid soap, or polyalcohol. They may be used alone or in combination of two or more types. The content of the surfactant is preferably 0.1 to 2.0 parts by mass when taking the total mass of the silicon carbide powders and the metal silicon powders as 100 parts by mass.

The pore former is not limited especially as long as it forms pores after firing, and exemplary pore former includes graphite, starch, resin balloon, water absorbing resin, and silica gel. The content of the pore former is preferably 0.1 to 5.0 parts by mass when taking the total mass of the silicon carbide powders and the metal silicon powders as 100 parts by mass. The average particle size of the pore former is preferably 10 to 30 μm. If it is smaller than 10 μm, pores may not be formed sufficiently. If it is larger than 30 μm, a large pore is easily formed, and may result in the reduction in strength. The average particle size of the pore former is a value measured by a laser diffraction method.

Next, it is preferable that the mixture obtained by mixing silicon carbide powders (silicon carbide), metal silicon powders (metal silicon), binder, surfactant, pore former, water, and the like is kneaded to obtain a pasty or slurry electrode part-forming raw material. A method for kneading is not limited especially, and a vertical stirrer may be used, for example.

Next, the obtained "electrode part-forming raw material containing a ceramic raw material" is preferably applied to the side face of the fired honeycomb body. Although a method for applying the electrode part-forming raw material to the side face of the fired honeycomb body is not limited especially, a printing method may be used, for example. It is preferable that the electrode part-forming raw material is applied to the side face of the fired honeycomb body to have a shape of the electrode part of the aforementioned honeycomb structure of the present invention. The thickness of the electrode part can be made as desired by adjusting the thickness of the electrode part-forming raw material applied. Since the electrode part can be formed, as mentioned above, only by applying the electrode part-forming raw material to the side face of the fired honeycomb body, followed by drying and firing, the electrode part can be formed very easily.

Next, it is preferable to dry the electrode part-forming raw material applied to the side face of the fired honeycomb body to form a pre-fired electrode, thus preparing a pre-fired electrode attached fired honeycomb body. A drying condition is preferably 50 to 100° C.

(Honeycomb Structure Preparation Step)

Next, it is preferable to fire the pre-fired electrode attached fired honeycomb body to prepare a honeycomb structure. At this time, the pre-fired electrode is fired mainly. Before firing, calcination is preferably performed to remove the binder and the like. The calcination is preferably performed at 400 to 500° C. for 0.5 to 20 hours in the ambient atmosphere. A method for calcination or firing is not limited especially, and it may be performed using an electric furnace, a gas furnace, or the like. As the firing conditions, it is preferably heated at 1,400 to 1,500° C. for 1 to 20 hours in an inert atmosphere of nitrogen, argon, or the like. After firing, it is preferable to perform an oxygenation treatment at 1,200 to 1,350° C. for 1 to 10 hours for improved durability.

EXAMPLES

The following describes the present invention more specifically by way of examples, and the present invention is by no means limited to these examples.

Example 1

Silicon carbide (SiC) powders and metal silicon (Si) powders were mixed together at the mass ratio of 80:20, thus preparing a ceramic raw material. To the ceramic raw material, hydroxypropyl methylcellulose as the binder and water absorbing resin as the pore former were added, and water was added to be a forming raw material. Then, the forming raw material was kneaded by a vacuum pugmill to prepare a circular columnar kneaded material. The content of the binder was 7 parts by mass when taken the total of the silicon carbide (SiC) powders and the metal silicon (Si) powders as 100 parts by mass. The content of the pore former was 3 parts by mass when taken the total of the silicon carbide (SiC) powders and the metal silicon (Si) powders as 100 parts by mass. The content of water was 42 parts by mass when taken the total of the silicon carbide (SiC) powders and the metal silicon (Si) powders as 100 parts by mass. The average particle size of the silicon carbide powders was 20 µm and the average particle size of the metal silicon powders was 6 µm. The average particle size of the pore former was 20 µm. The average particle size of silicon carbide, metal silicon, and pore former was a value measured by a laser diffraction method.

The circular columnar kneaded material obtained was formed by an extruder to obtain a formed honeycomb body. After thus obtained formed honeycomb body had been subjected to high-frequency dielectric heat-drying, it was further dried at 120° C. for 2 hours using a hot air drier, and a predetermined amount of both end faces was cut off, thus preparing a dried honeycomb body.

Then, the dried honeycomb body was degreased (calcination) and fired, and was further oxidation-treated to obtain a fired honeycomb body. Conditions of degreasing were 550° C. for 3 hours. Conditions of firing were 1,450° C. for 2 hours in an argon atmosphere. Conditions of the oxidation treatment were 1,300° C. for 1 hour. For firing, "particles 32 including silicon as a main component" were spread on the mounting table 33 in such a manner to spread joint sand as shown in FIG. 5, on which (on the particles 32 including silicon as a main component) the dried honeycomb body 31 was mounted so as to direct its end face 34 on one side downward. At this time, 50 g of "particles including silicon as a main component" were spread underneath the end face of the dried honeycomb body. Then, the dried honeycomb body was fired in this state. "The particles including silicon as a main component" used were metal silicon powders of 15 µm in average particle size. The average particle size was measured by a laser diffraction method.

Next, silicon carbide (SiC) powders and metal silicon (Si) powders were mixed at the mass ratio of 60:40, to which hydroxypropyl methylcellulose as binder, glycerin as moisturizer, and surfactant as dispersant as well as water were added for mixing. The mixture was kneaded to be an electrode part-forming raw material. The content of the binder was 0.5 part by mass when taken the total of the silicon carbide (SiC) powders and the metal silicon (Si) powders as 100 parts by mass, the content of the glycerin was 10 parts by mass when taken the total of the silicon carbide (SiC) powders and the metal silicon (Si) powders as 100 parts by mass, the content of the surfactant was 0.3 part by mass when taken the total of the silicon carbide (SiC) powders and the metal silicon (Si) powders as 100 parts by mass, and the content of water was 42 parts by mass when taken the total of the silicon carbide (SiC) powders and the metal silicon (Si) powders as 100 parts by mass. The average particle size of the silicon carbide powders was 52 µm and the average particle size of the metal silicon powders was 6 µm. The average particle size of the silicon carbide and metal silicon was a value measured by a laser diffraction method. The kneading was performed by a vertical type kneader.

Next, the electrode part-forming raw material was applied to the side face of the fired honeycomb body to have a belt-like shape extending over between both of the end faces of the fired honeycomb body in such a manner that the thickness was 0.15 mm and "0.5 time the central angle in a cross section orthogonal to the cell extending direction was 15°". The electrode part-forming raw material was applied at two positions on the side face of the dried fired honeycomb body. In a cross section orthogonal to the cell extending direction, one of the two portions having the electrode part-forming raw material applied thereto was disposed on the opposite side from the other portion across the center of the fired honeycomb body.

Next, the electrode part-forming raw material applied to the fired honeycomb body was dried, whereby a pre-fired electrode attached fired honeycomb body was obtained. Temperature of drying was 70° C.

Then, the pre-fired electrode attached fired honeycomb body was degreased (calcination) and fired, and was further oxidation-treated to obtain a honeycomb structure. Conditions of degreasing were 550° C. for 3 hours. Conditions of firing were 1,450° C. for two hours in an argon atmosphere. Conditions of the oxidation treatment were 1,300° C. for 1 hour.

The obtained honeycomb structure had an average pore size (pore size) of the partition wall of 8.6 µm and porosity of 45%. The average pore size and the porosity were values measured by a mercury porosimeter. The partition wall of the honeycomb structure had a thickness of 140 µm, and the cell density was 90 cells/cm². The bottom face of the honeycomb structure had a circular shape of 93 mm in diameter, and the length of the honeycomb structure in the cell extending direction was 75 mm. The honeycomb structure obtained had isostatic strength of 2.5 MPa. The isostatic strength is fracture strength measured by applying hydrostatic pressure thereto in water. In a cross section orthogonal to the cell extending direction, 0.5 time the central angle of the two electrode parts of the honeycomb structure was 40°. The thickness of each of the two electrode parts was 0.15 mm. The electrode parts had electric resistivity of 1.3 Ωcm, the honeycomb structure body had electric resistivity at the inflow-side area of 20 Ωcm and electric resistivity at the outflow-side area of 35 Ωcm. The inflow-side area had a length in the cell-extending direction (inflow-side area length) of 20 mm. The inflow-side area included a boundary area. The boundary area had a length in the cell-extending direction (boundary area length) of 5 mm. The boundary area had electric resistivity that gradually increases from "the end of the side of the inflow-side area" to "the start of the outflow-side area". The electric resistivity was a value measured by a four-terminal method.

Figure 6:
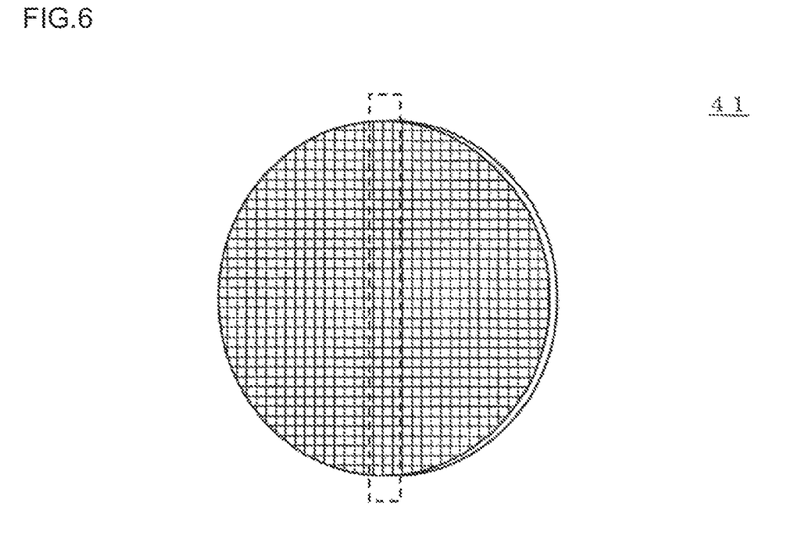
FIG. 6 shows a disk that is prepared by cutting the honeycomb structure of Example 1 into round slices.
Figure 7:
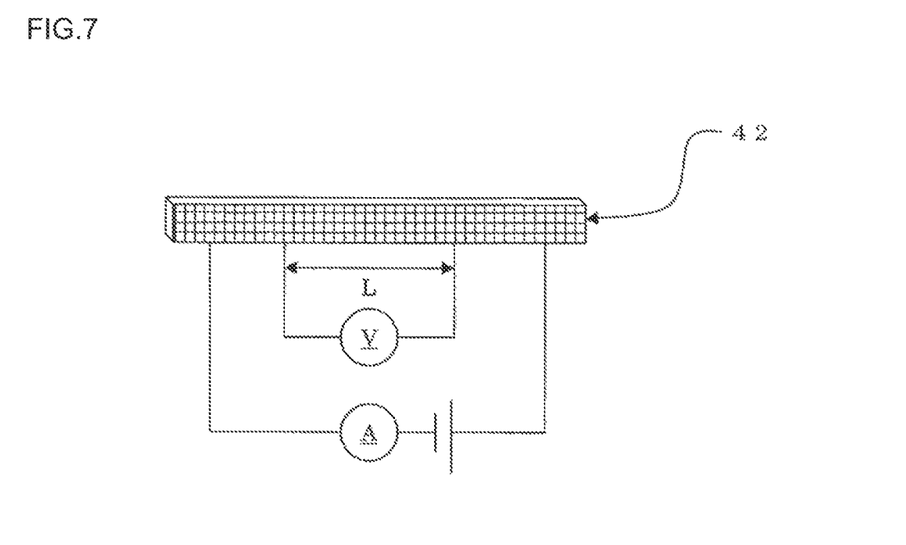
FIG. 7 shows a rod-shaped sample cut from the honeycomb structure of Example 1.

Herein, the electric resistivity each of the inflow-side area of the honeycomb structure body and the outflow-side area of the honeycomb structure body was measured by the following method. The honeycomb structure body (honeycomb structure) was cut into round slices to be a disk (disk 41, see FIG. 6) having a cross section orthogonal to the cell extending direction and a thickness of 3 mm. Then, a part (part surrounded with broken lines in FIG. 6) of the diameter passing through the center of the disk 41 was cut from the disk 41 shown in FIG. 6 to have a width of 1 cm, whereby a rod-shaped sample 42 as shown in FIG. 7 was prepared. Then, as shown in FIG. 7, voltage was applied to each rod-shaped sample 42, thus finding volume resistivity (electric resistivity) in the range of the length L (4 cm) (measured by four-terminal method). FIG. 6 shows the disk 41 that was prepared by cutting the honeycomb structure of Example 1 into round slices. FIG. 7 shows a rod-shaped sample 42 cut from the honeycomb structure of Example 1.

The electric resistivity of the electrode parts was measured by the following method. A test piece made of the same material of the electrode parts and having a size of 10 mm×10 mm×50 mm was prepared. Silver paste was applied to the entire face of both end parts of the test piece for wiring to be ready for energization. Then, a voltage-applying current measurement device was connected to the test piece, and voltage was applied thereto. A thermocouple was disposed at the center portion of the test piece, and the change in temperature of the test piece with elapse of time while applying voltage thereto was checked by a recorder. A current value and a voltage value were measured at a state where the temperature of the test piece was 400° C. while applying 100 to 200 V thereto, and electric resistivity was calculated from the current value and the voltage value obtained and the dimensions of the test piece.

The gradual change in the electric resistivity at the boundary area was checked by the following method. Firstly, the honeycomb structure body was cut into round slices to be a disk (disk 41, see FIG. 6) having a cross section orthogonal to the cell extending direction and a thickness of 3 mm. At this time, the honeycomb structure body as a whole was cut into round slices from one end part to the other end part, thus preparing a plurality of pieces of disks. Note here that, if the boundary area is found, the cutting of the honeycomb structure body into round slices was discontinued at that time. Then, a part (part surrounded with broken lines in FIG. 6) of the diameter passing through the center of the disk 41 was cut from the disk 41 shown in FIG. 6 to have a width of 1 cm, whereby a rod-shaped sample 42 as shown in FIG. 7 was prepared. Then, as shown in FIG. 7, voltage was applied to each rod-shaped sample 42, thus finding volume resistivity (electric resistivity) in the range of the length L (4 cm) (four-wire resistance measurement). In this way, the change in electric resistivity at the boundary area was checked.

The "purification performances" of the respective obtained honeycomb structures were determined by the following method. The results are shown in Table 1.

(Purification Performance)

A honeycomb structure was stored in a cylindrical storage vessel, and the storage vessel was attached to an exhaust line of a gasoline engine with displacement of 2.0 L. After driving at the exhaust gas control mode "JC-08", exhaust gas was sampled from a conduit connected to the exhaust line and was stored in a bag. The conduit for sampling was displaced downstream of the storage vessel storing the honeycomb structure. After the completion of driving, exhaust gas stored in the bag was analyzed to measure HC emission (pursuant to the specifications of JC-08). A value of the ratio of the reciprocal of the HC emission to the value in Comparative Example 1 (reciprocal of HC emission) was taken as a value for purification performance. Purification performance larger than 1 shows that purification performance is better than that of Comparative Example 1. To determine the purification performance, voltage was applied to the honeycomb structure at 6 kW for 20 seconds at the time of cold engine starting for driving at the exhaust gas control mode "JC-08".

TABLE 1

| | Inflow-side area length (mm) | Boundary area length (mm) | Electric resistivity of inflow-side area Ωcm | Electric resistivity of outflow-side area Ωcm | Purification performance — |
|---|---|---|---|---|---|
| Example 1 | 20 | 5 | 20 | 35 | 1.41 |
| Example 2 | 20 | 10 | 20 | 35 | 1.49 |
| Example 3 | 30 | 7.5 | 20 | 35 | 1.6 |
| Example 4 | 40 | 10 | 20 | 35 | 1.55 |
| Example 5 | 20 | 5 | 10 | 35 | 1.28 |
| Example 6 | 20 | 5 | 32 | 35 | 1.05 |
| Comp. Ex. 1 | 0 | 0 | — | 35 | 1 |

Examples 2 to 6

Comparative Example 1

Honeycomb structures were prepared similarly to Example 1 except that their electric resistivity at the inflow-side area, length of the inflow-side area and length of the boundary area were changed as shown in Table 1. "Inflow-side area length" is "a length in the cell-extending direction" of the inflow-side area. "Boundary area length" is "a length in the cell-extending direction" of the boundary area. Similarly to Example 1, "purification performance" of the honeycomb structures was measured. The results are shown in Table 1, too.

It can be understood from Table 1 that energy consumed for exhaust gas purification is less when the electric resistivity of a material used for the inflow-side area was lower than electric resistivity of a material of the outflow-side area.

The honeycomb structure of the present invention can be used suitably for a catalyst carrier for exhaust gas purification device to purify exhaust gas from an automobile.

DESCRIPTION OF REFERENCE SYMBOLS

1: partition wall
2: cell
3: outer peripheral wall
4: honeycomb structure body
5: side face
6: inflow-side area
7: outflow-side area
8: boundary area
8a: end on the side of inflow-side area
8b: boundary with the outflow-side area
11: inflow end face
12: outflow end face
21: electrode part
31: dried honeycomb body
32: particles including silicon as a main component
33: mounting table
34: end face of dried honeycomb body
41: disk
42: rod-shaped sample
100, 200: honeycomb structure
O: center
α: central angle
β: angle
θ: angle that is 0.5 time the central angle
L: length

What is claimed is:

1. A honeycomb structure, comprising: a tubular honeycomb structure body including porous partition walls separating and defining a plurality of cells extending from an inflow-end face as an end face on an inflow-side of fluid to an outflow-end face as an end face on an outflow-side of the fluid and serving as through channels of fluid, and an outer peripheral wall located at an outermost periphery; and a pair of electrode parts disposed on a side face of the tubular honeycomb structure body, wherein the tubular honeycomb structure body has an electric resistivity of 1 to 200 Ωcm, each electrode part of the pair of electrode parts has a belt-like shape extending in an extending direction of the plurality of cells of the tubular honeycomb structure body, each electrode part of the pair of electrode parts is placed on an opposite side from each other across a center of the tubular honeycomb structure body in a cross section orthogonal to the extending direction of the plurality of cells, the tubular honeycomb structure body includes an inflow-side area that is an area on the inflow-side of fluid and covering the inflow end face, and an outflow-side area that is an area other than the inflow-side area, and the porous partition walls of the inflow-side area are made of a material having an electric resistivity lower than the electric resistivity of a material defining the porous partition walls of the outflow-side area.

2. The honeycomb structure according to claim 1, wherein the tubular honeycomb structure body and the pair of electrode parts are made of a material including silicon carbide.

3. The honeycomb structure according to claim 1, wherein the tubular honeycomb structure body has an end face having a diameter that is three times or less a length of the tubular honeycomb structure body in the extending direction of the plurality of cells.

4. The honeycomb structure according to claim 2, wherein the tubular honeycomb structure body has an end face having a diameter that is three times or less a length of the tubular honeycomb structure body in the extending direction of the plurality of cells.

5. The honeycomb structure according to claim 1, wherein the inflow-side area ends at a boundary area forming a boundary zone with the outflow-side area, and the boundary area is an area where electric resistivity thereof gradually changes so that the electric resistivity increases with going closer to the outflow-side area.

6. The honeycomb structure according to claim 2, wherein the inflow-side area ends at a boundary area forming a boundary zone with the outflow-side area, and the boundary area is an area where electric resistivity thereof gradually changes so that the electric resistivity increases with going closer to the outflow-side area.

7. The honeycomb structure according to claim 3, wherein the inflow-side area ends at a boundary area forming a boundary zone with the outflow-side area, and the boundary area is an area where electric resistivity thereof gradually changes so that the electric resistivity increases with going closer to the outflow-side area.

8. The honeycomb structure according to claim 4, wherein the inflow-side area ends at a boundary area forming a boundary zone with the outflow-side area, and the boundary area is an area where electric resistivity thereof gradually changes so that the electric resistivity increases with going closer to the outflow-side area.

9. A method for manufacturing a honeycomb structure, comprising:

a step of extruding a forming raw material containing a ceramic raw material to prepare a formed tubular honeycomb structure body having partition wall that separate and define a plurality of cells extending from one end face to the other end face and serving as channels of fluid, and an outer peripheral wall located at an outermost periphery;

a step of drying the formed tubular honeycomb structure body to prepare a dried tubular honeycomb structure body;

a step of firing the dried tubular honeycomb structure body to prepare a fired tubular honeycomb structure body;

a step of applying an electrode-part forming raw material containing a ceramic raw material to a side face of the fired tubular honeycomb structure body, followed by drying, to form a pre-fired electrode, thus preparing a pre-fired electrode attached fired tubular honeycomb structure body; and a step of firing the pre-fired electrode attached fired tubular honeycomb structure body to prepare a tubular honeycomb structure body, wherein the dried tubular honeycomb structure body is fired in a state where a plurality of particles including silicon as a main component is brought into contact with an end face on one side of the dried tubular honeycomb structure body at the fired tubular honeycomb structure body preparation step, the tubular honeycomb structure body has an electric resistivity of 1 to 200 Ωcm, each electrode part of the pair of electrode parts has a belt-like shape extending in an extending direction of the plurality of cells of the tubular honeycomb structure body, each electrode part of the pair of electrode parts is placed on an opposite side from each other across a center of the tubular honeycomb structure body in a cross section orthogonal to the extending direction of the plurality of cells, the tubular honeycomb structure body includes an inflow-side area that is an area on the inflow-side of fluid and covering the inflow end face, and an outflow-side area that is an area other than the inflow-side area, and the porous partition walls of the inflow-side area are made of a material having an electric resistivity lower than the electric resistivity of a material defining the porous partition walls of the outflow-side area.

\* \* \* \* \*